Nov. 14, 1939.   E. B. MOORE   2,180,253
AGRICULTURAL MACHINE
Filed Aug. 14, 1937
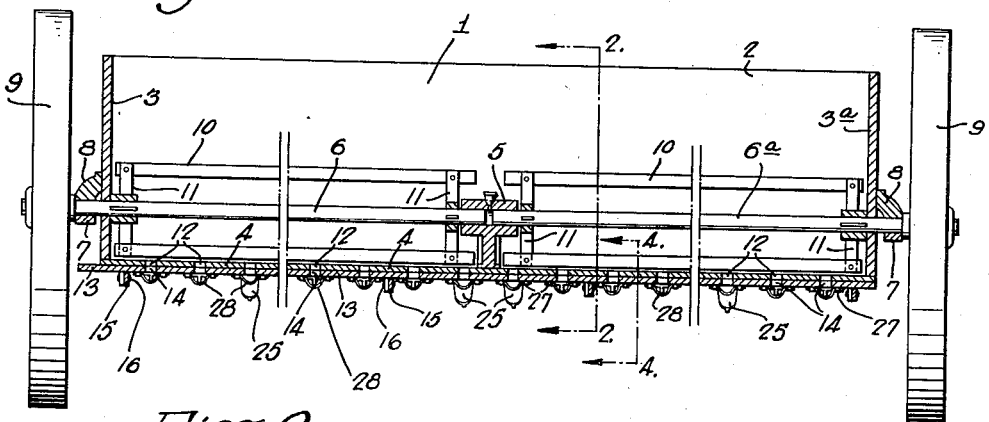
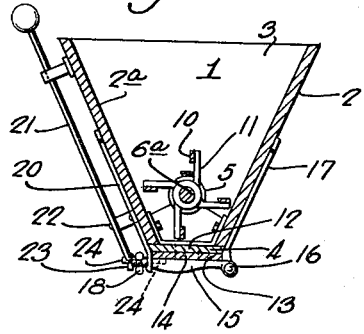
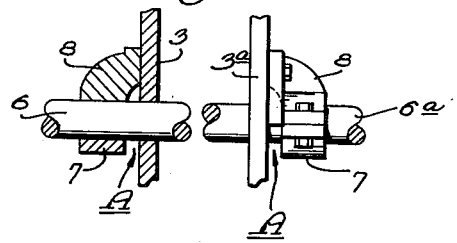
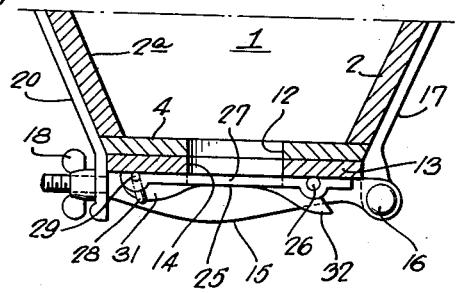
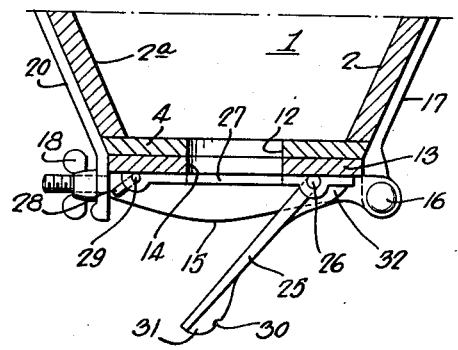
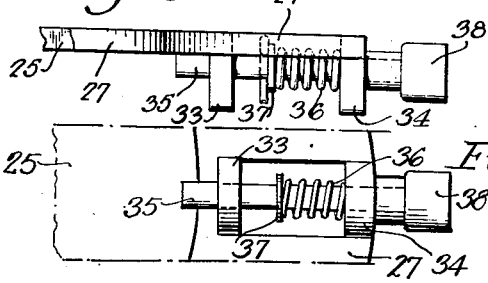
Inventor:—
Eugene B. Moore
by his Attorneys
Howson & Howson Patented Nov. 14, 1939

2,180,253

UNITED STATES PATENT OFFICE 2,180,253

AGRICULTURAL MACHINE

Eugene B. Moore, Swedesboro, N. J.

Application August 14, 1937, Serial No. 159,151

3 Claims. (Cl. 275—14)

This invention relates to new and useful improvements in agricultural machinery and more particularly to improvements in machines for spreading and distributing fertilizer, lime and like substances upon the surface of the ground.

The invention resides in the novel combination and arrangement of parts and the details of construction thereof and has for its object to provide a machine of the type described which is characterized by its more practical and efficient operation and use.

Other objects of the invention and the features and details of construction thereof are set forth hereinafter and shown in the accompanying drawing, in which:

Figure 1 is a view in vertical section taken lengthwise through the hopper of a machine embodying the present invention;

Figure 2 is a view in section on line 2—2, Figure 1;

Figure 3 is an enlarged fragmentary view partially in section illustrating certain details of the construction and arrangement of the agitator and wheel shafts and their bearings;

Figure 4 is an enlarged fragmentary view in section taken on line 4—4, Figure 1 showing certain parts of the invention in closed or inoperative position;

Figure 5 is a view similar to Figure 4 showing showing such parts in open or operative position;

Figure 6 is an enlarged fragmentary view in elevation illustrating a modified form of means for securing the closure plates in closed or inoperative position; and Figure 7 is an inverted fragmentary view in plan of the disclosure of Figure 6.

Referring now more particularly to the drawing, a machine for distributing and spreading fertilizer, lime and the like made in accordance with my invention comprises a hopper 1 having the cross section shape illustrated in Figure 2 and adapted to hold a supply of the material to be spread over the surface of the ground. The hopper 1 in the present instance is composed of upwardly diverging front and rear walls 2 and 2a, end walls 3 and 3a and a bottom member 4. A sleeve bearing 5 is secured within the hopper 1 adjacent the bottom 4 substantially midway between the end walls 3 and 3a thereof and the adjacent ends of a pair of aligned shafts 6 and 6a are journalled in said bearing 5, and project laterally therefrom in opposite directions through openings in the end walls 3 and 3a of the hopper where they are supported in the bearing portions 7 of brackets 8 secured to the outer faces of said end walls. Wheels 9 are fixedly secured upon the outer ends of the shafts 6 and 6a and agitators 10 are also secured thereon for rotation within the hopper by means of spiders or the like 11.

The brackets 8 are constructed and arranged in such manner that when secured to the outer faces of the end walls 3 and 3a of the hopper 1 the shaft supporting sleeve or bearing portions 7 thereof are outwardly offset or spaced from the adjacent face of said end walls, as shown in Figure 3 of the drawing, so that the corrosive fertilizer, lime and the like, which tends to work outwardly of the hopper along the shafts 6 and 6a, will fall from said shafts through the openings or gaps A provided between the sleeve portions 7 and the face of the end walls 3 and 3a. Thus the corrosive fertilizer and lime is prevented from entering the sleeve or bearing portions 7 and the possibility of corrosion of the inner bearing or journal surfaces thereof is substantially eliminated.

As shown in several figures of the drawing, the bottom 4 of the hopper 1 is provided with a plurality or series of aligned outlet apertures or openings 12 therein and a plate 13 is slidably supported against the underside of said hopper bottom 4 and provided with apertures or openings 14 therein adapted, in one position of said plate 13, to register with the openings 12 in said bottom 4. For the purpose of permitting easy removal or detachment of the plate 13 at will for cleaning purposes to prevent corrosion thereof, I prefer to slidably support said plate 13 at the underside of the hopper bottom 4 by means of a plurality of elements 15 one end of each of which is pivoted as indicated at 16 to the lower end of a plurality of bracket members or strips 17 secured to the external face of the front wall 2 of the hopper while the other end of each element 15 is releasably secured by means of wing nuts or the like 18 in open ended slots formed in the lower ends of correspondingly positioned bracket members or strips 20 secured to the external surface of the rear wall 2a of said hopper. Thus by merely loosening the wing nuts 18 the supporting elements 15 may be swung or will drop downwardly about their pivots 16 from beneath the plate 13 which may then be easily and readily removed.

The plate 13 may be actuated relatively to the hopper bottom 4 to control the discharge of material from the hopper through the openings 12 therein by any suitable mechanism such as for example by means of a lever 21 pivoted to the rear wall 2a of the hopper as at 22 and having its lower end detachably or releasably connected by means of a rod, bar or the like 23 to a bracket, lug or the like 24 secured to and projecting from the underside of said plate 13.

For the purpose of closing the several apertures or openings 14 in the slidable plate 13 to further control the passage of material from the hopper therethrough, a plurality of closure elements 25, one for each of said openings 14, are hingedly supported as indicated at 26 at the under side of said plate 13 by means of individual brackets 27, and catch elements 28 which are rotatably carried by the brackets 27 as indicated at 29 so that they may be swung free of the closure elements 25 and then beneath the latter to releasably engage the notch or slot 30 in the projection or lug 31 on the underside thereof at will for the purpose of locking said elements in closing relation to the apertures 14 in the plate 13. In order that the closure elements 25 when in open relation to the openings 14 in the plate 13 may be utilized as baffles or deflectors to aid in the distribution and spreading of the material discharged through openings in the hopper bottom 4, an angular lug or projection 32 is formed on the underside of each element 25 adjacent its pivot 26 and arranged to engage a portion of the under surface of the brackets 27 as illustrated in Figure 5 of the drawing to act as a stop to limit the extent of opening of the elements 25 to a position at an acute angle to the under surface of the plate 13. Thus material discharging through the openings 14 in the plate 13 will engage the angular surface afforded by the elements 25 when open and be deflected and uniformly spread thereby over a substantial area of the ground over which the machine is travelling, and by providing individual closure elements 25 for each opening 14 in said plate 13 any one or a number of said openings may be selectively opened or closed as desired by the operator of the machine.

In lieu of the catch elements 28 which engage the notch 30 in the projection 31 on the closure elements 25, a modified form of catch may be employed to secure said elements 25 in closed or inoperative relation with respect to the ports 14 in the slidable plate 13, and as shown in Figure 6 of the drawing, in this modification the individual brackets 27 are formed to include a pair of spaced collar portions 33 and 34 in which a catch or bolt 35 is slidably mounted. Springs 36 act between the outer collar portions 34 and washers 37 carried by the bolts 35 and these springs constantly urge said bolts inwardly so that their inner ends engage under the adjacent edge portions of the closure elements 25 to secure them in closing relation to the port 14 in the plate 13. A grip 38 is provided at the outer end of the bolts 35 by which the latter may be withdrawn against the action of the springs 36 to disengage said bolts from the closures 25 whereupon they will drop or pivot downwardly and be supported at an acute angle to the plate 13 by means of the angular lug or projection at the underside of said closures 25 as and in the manner previously described.

While a particular embodiment of the invention has been herein described and illustrated in the accompanying drawing, it is not intended that said invention shall be limited to such disclosure, but that modifications and changes may be incorporated and embodied therein within the scope of the annexed claims.

I claim:

1. In a machine of the character described, an apertured plate, a series of brackets corresponding to each aperture in said plate secured at the underside thereof, a closure member for each aperture pivotally carried by each such bracket, and means on each of said closure members arranged to engage an overlying part of the machine and support the closure members at an acute angle to the plate below the apertures when in open relation thereto for the purpose of deflecting and spreading material discharged through said apertures.

2. In a machine of the character described, an apertured plate, a series of brackets corresponding to each aperture in said plate secured at the underside thereof, a closure member for each aperture pivotally carried by each such bracket, means on each of said closure members arranged to engage an overlying part of the machine and support the closure members at an acute angle to the plate below the apertures when in open relation thereto for the purpose of deflecting and spreading material discharged through said apertures, and means also carried by said brackets for securing said closure members in closing relation with respect to their corresponding apertures.

3. In a machine of the character described, an apertured plate, a series of brackets corresponding to each aperture in said plate secured at the underside thereof, a closure member for each aperture pivotally carried by each such bracket, and means also carried by each of said brackets for securing its closure member in closing relation with respect to its corresponding aperture comprising a slidably mounted catch member arranged to engage under said closure member and resilient means urging said catch member inwardly for engagement with the closure member.

EUGENE B. MOORE.